Oct. 12, 1965 L. R. KAHN 3,212,008

COMPATIBLE SINGLE-SIDEBAND SYSTEM

Filed June 14, 1961 2 Sheets-Sheet 1

INVENTOR.
LEONARD R. KAHN
BY Mathis and Graybeal
ATTORNEYS

COMPATIBLE SINGLE-SIDEBAND SYSTEM

Filed June 14, 1961 2 Sheets-Sheet 2

INVENTOR.
LEONARD R. KAHN
BY Mathis and Graybeal
ATTORNEYS 3,212,008

COMPATIBLE SINGLE-SIDEBAND SYSTEM

Leonard R. Kahn, 81 S. Bergen Place, Freeport, N.Y.
Filed June 14, 1961, Ser. No. 117,143
19 Claims. (Cl. 325—137)

This application is a continuation-in-part of my U.S. Patent No. 2,989,707, entitled Compatible Single-Sideband Radio Transmission System, issued June 20, 1961.

The present invention relates to improvements in electromagnetic energy transmission systems of the single-sideband type wherein the signal is receivable by either single-sideband or double-sideband receivers, i.e. what may be termed compatible single-sideband systems. More particularly, the present invention relates to means of and methods for realizing improved transmission characteristics in such systems by controlling the extent of phase modulation so as to be non-linearly related to the level of signal modulation.

In general, the basic technique disclosed in said U.S. Patent 2,989,707 by which a single-sideband-and-carrier wave is modified to render such compatibly receivable by either single-sideband receivers or double-sideband receivers employing envelope detection is to separate the phase modulation component and the amplitude modulation component of a conventional single-sideband and carrier wave, then increase the extent of phase modulation by a factor of about 1.4 by frequency multiplication and frequency division, then amplitude modulating the carrier and increased phase modulation component with the fundamental of the audio frequency component, obtained by either product demodulating the single-sideband and carrier wave envelope, or directly from the audio wave input to the single-sideband generator. An improved technique with regard to the basic system where frequency division and frequency multiplication are involved is also disclosed and claimed in my U.S. Pat. No. 3,012,209, entitled Frequency Modifying Apparatus, and issued December 5, 1961.

In my earlier compatible single-sideband systems, the use of frequency multiplication and frequency division to increase the phase modulation by a factor of approximately 1.4 gives rise to certain operational disadvantages in that while the desired phase modulation was realized at relatively high percentages of modulation, a linear increase in the index of phase modulation resulted in less than optimum spectrum characteristics at lower levels of modulation. Also whenever the level of modulation exceeded the point where the single-sideband is stronger than the carrier, then there is a tendency for a shift in average frequency of the signal to occur. As will be recognized, shift in average frequency can give rise to adverse effects in the signal level responsive circuits of a receiver.

Objects, advantages and features of the present invention include the provision of a compatible single-sideband modulation system and technique wherein undesired sideband radiation is reduced irrespective of the instantaneous amplitude modulation level, wherein the wave is relatively insensitive to overmodulation, wherein the system is simple, reliable, easily adjustable and provides means for increasing the phase modulation level by mixing and summation selection of a plurality of single-sideband and carrier wave derived phase modulation components (i.e. by phase modulation addition), and wherein operational adjustment to relatively favor either a minimum of envelope distortion or a minimum of undesired sideband radiation is easily and directly available by simple bias adjustment.

In order to properly analyze the nature of the modulated wave characteristic of a compatible single-sideband system, attention is to be given to some of the theoretical considerations and practical ramifications involved. For compatible reception by either single-sideband or double-sideband receivers, the ideal compatible single-sideband signal would have no envelope distortion, and its spectrum components would lie only on one side of the carrier and be limited to three components at high percentages of modulation and two components at low percentages of modulation. The complete satisfaction of both of these characteristics simultaneously is a technical impossibility. However, from a practical standpoint, close approximations as to both specifications can be achieved.

For broadcast applications the requirement as to a theoretically distortion-free envelope is paramount. Therefore, in broadcast applications, some deviation from the ideal situation can be tolerated from the point of view of undesired sideband radiation. To be observed as an important characteristic of operating modes according to the present invention where envelope distortion is minimized in favor of undesired sideband radiation, is that the level of undesired radiation is relatively quite small and the nature of the transmission still quite suitable for broadcast applications.

The envelope of a conventional single-sideband-and-carrier wave is highly distorted at high percentages of modulation, and necessarily so because the wave has but two components. When the sideband approaches the level of the carrier in a conventional single-sideband-and-carrier wave, the envelope distortion is approximately 24%. Such order of distortion is obviously unacceptable for broadcast usage and would seriously degrade even conventional communication systems. Also, it is to be observed with respect to the conventional single-sideband-and-carrier wave that distortion accounts for much of the negative modulation swing, and full or 100% modulation cannot be achieved. Actually the maximum modulation value is equivalent to only about 67% of the average value of the wave and, in addition, there is a severe carrier shift as the sideband level approaches the carrier level. A good comparison of conventional single-sideband-and-carrier type modulation and compatible single-sideband type modulation by Mr. Ralph Harmon is available in the National Association of Broadcasters Engineering Handbook, 1960, published by McGraw Hill and Company, at pages 8–41 through 8–52.

Since a two-component wave has an envelope function at higher modulation levels which is highly distorted and unacceptable to a truly compatible single-sideband system where some receivers utilize envelope demodulation, it is necessary for compatibility to transmit additional spectral components in order to make the wave compatible. In practice, and according to the invention disclosed and claimed in my aforesaid U.S. Patent 2,989,707, the single-sideband wave is rendered compatible by reconstituting the wave as a three-tone wave at higher levels of modulation, having in such situation a somewhat reduced carrier and a relatively small but substantial second order sideband on the same side of the carrier as the first order sideband.

Returning to a general consideration of the ideal characteristics incident to a compatible single-sideband wave, the theoretical spectral pattern occurring without any envelope distortion in the situation of a three-tone wave, is where the ratio of carrier to first order single-sideband to second order single-sideband is 0.5:1.0:0.5. In this situation, the wave closely resembles a conventional 100% modulated, amplitude modulated wave, the difference being that the carrier is at one side of the spectrum of the wave instead of in the center as in a conventional amplitude modulated wave.

Even though the 0.5:1.0:0.5 spectral relation would appear to be the best choice for a three-tone wave because of the absence of envelope distortion, another requirement affects the choice. This other requirement necessitates a lower ratio of second order sideband to first order sideband in order to minimize undesired sideband radiation when complex audio frequency waves are transmitted. With complex audio frequency signal inputs, the phenomenon known as "beating" can occur, which phenomenon of itself produces undesired sideband radiation.

Because of the desirability of minimizing any beating between the audio wave components, the preferred ratio of carrier to first-order-sideband to second-order-sideband in a compatible wave characteristic of the invention at full modulation is about 0.7:1.0:0.3.

At lesser percentages of modulation, the required second order component is very small, finally degenerating into essentially a two-tone wave at low modulation levels.

In the following analysis, it will be assumed that the first order sideband is a linear function of percentage of modulation and that the second order sideband follows a squared function of the percentage of modulation. The carrier amplitude at low percentage of modulation equals the average amplitude of the wave and gradually decreases as the modulation level increases. These are approximate relationships that do, however, appear to fit practical situations and are very helpful in realizing some of the technique used.

It is to be stressed that the average total amplitude of a compatible single-sideband wave is constant and does not shift with variation in percentage of modulation, i.e. modulation level. In other words, there is no carrier shift created. Of course, if the transmitter has distortion which creates carrier shift when transmitting amplitude modulation, it will also experience the same carrier shift when transmitting a compatible single-sideband wave.

Since the higher frequency components of voice and musical waves are of relatively quite low amplitude, the spectrum requirement for a compatible single-sideband wave is approximately equal to the audio bandwidth and a wave closely approximating the bandwith of a conventional single-sideband wave is generated. When low frequency high amplitude signals are transmitted, the second order sideband is required. However, because this second order sideband falls well within the bandwidth of the signal, the presence of a second order sideband for low audio frequencies does not increase the practical bandwidth requirement but merely thickens the spectrum of the wave.

In order to avoid the problems of variation in extent of envelope distortion and extent of undesired sideband radiation (i.e. spurious) as a consequence of change in modulation level, the compatible single-sideband system and technique characteristic of the present invention employs addition of a plurality (e.g. two) phase modulation waves, the sum of which simulates closely the PM waveshape desired for compatible single-sideband transmission. The plurality of phase modulation waves are derived from the single-sideband plus carrier wave, i.e. a two-tone wave. In a typical case, as here disclosed, one phase modulation component wave is developed so that its phase modulation is non-linearly derived from a portion of the two-tone wave having a sideband to carrier ratio of 1.0:1.0 at 100% modulation, and a second phase modulation component wave is non-linearly derived from another portion of the two-tone wave having a sideband-to-carrier ratio of 0.5:1.0 at 100% modulation. These two PM components are then limited and mixed together, the summation output of the mixer being chosen so that the resulting phase modulation wave is the sum of the two phase modulation components (i.e. 1.0 PM plus 0.5 PM) at 100% envelope modulation. Measurement and analysis indicate that at 100% envelope modulation this signal has about 30 db less energy in the undesired sideband.

At lower percentages of modulation, however, the same type of phase modulation component is not desired since actually less phase modulation is required at lower modulation levels, as above indicated. In order to secure less phase modulation at lower modulation levels, the technique and system characteristic of this invention employs non-linear circuitry attenuating the extent of phase modulation resulting from phase modulation addition, with the attenuation being greater at lower levels of envelope modulation than at higher levels.

The phase modulation of the transmitted compatible wave is non-linearly emphasized at higher instantaneous envelope excursions by summating phase modulated component waves, one such component wave being non-linearly derived from a two-tone wave having a sideband-to-carrier ratio of 1.0:1.0 at 100% modulation, and the other such component wave being non-linearly derived from a two-tone wave having a sideband-to-carrier ratio of 0.5:1.0 at 100% modulation, the said component waves providing in the compatible wave an extent of maximum phase modulation deviation which can be described as about 1.0 PM at very low instantaneous envelope excursions (i.e. at excursions corresponding to the maximum envelope voltage change at a modulation level of less than about 10%), then progressively increasing in relation to increasing maximum envelope excursions to the point where the maximum phase modulation deviation is 1.0 PM plus 0.5 PM at maximum envelope excursions incident to 100% envelope modulation, where 1.0 PM is the maximum phase modulation deviation of a conventional, two-tone single sideband wave at relatively the same envelope modulation level.

Expressed otherwise, the phase modulation of the compatible wave here presented is related in a non-linear manner to the phase modulation of the conventional single-sideband wave from which it is derived, the non-linear relation being such that the maximum phase modulation deviation of the compatible wave of the present invention is progressively but relatively only slightly greater than that of a conventional single-sideband wave for envelope modulation excursions corresponding to modulation levels up to about 60%, above which extent of deviation the maximum phase modulation deviation of the compatible wave is progressively accentuated until at maximum envelope excursions incident to 100% envelope modulation its maximum phase modulation deviation is greater than the maximum phase modulation deviation of the conventional wave by a relation describable as about 1.0 PM plus 0.5 PM, where the maximum phase modulation deviation of the conventional wave is 1 PM.

In order to observe in greater detail some of the consideration pertaining to the present invention, and system and circuit arrangements typical thereof, reference is to be made to the accompanying illustrations, wherein:

FIG. 3 is a schematic presentation of the circuit detail found in the non-linear networks forming an essential part of the transmitter shown in FIG. 2.

Figure 1:
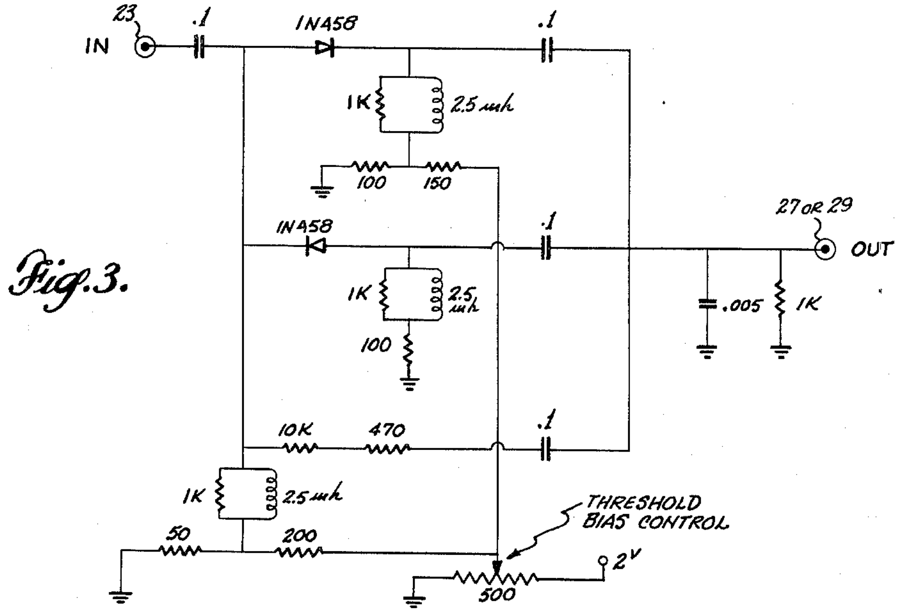
FIG. 1 is a graphical presentation of output phase shapes of variously constituted phase modulation components, observed as a function of time.
Figure 1:
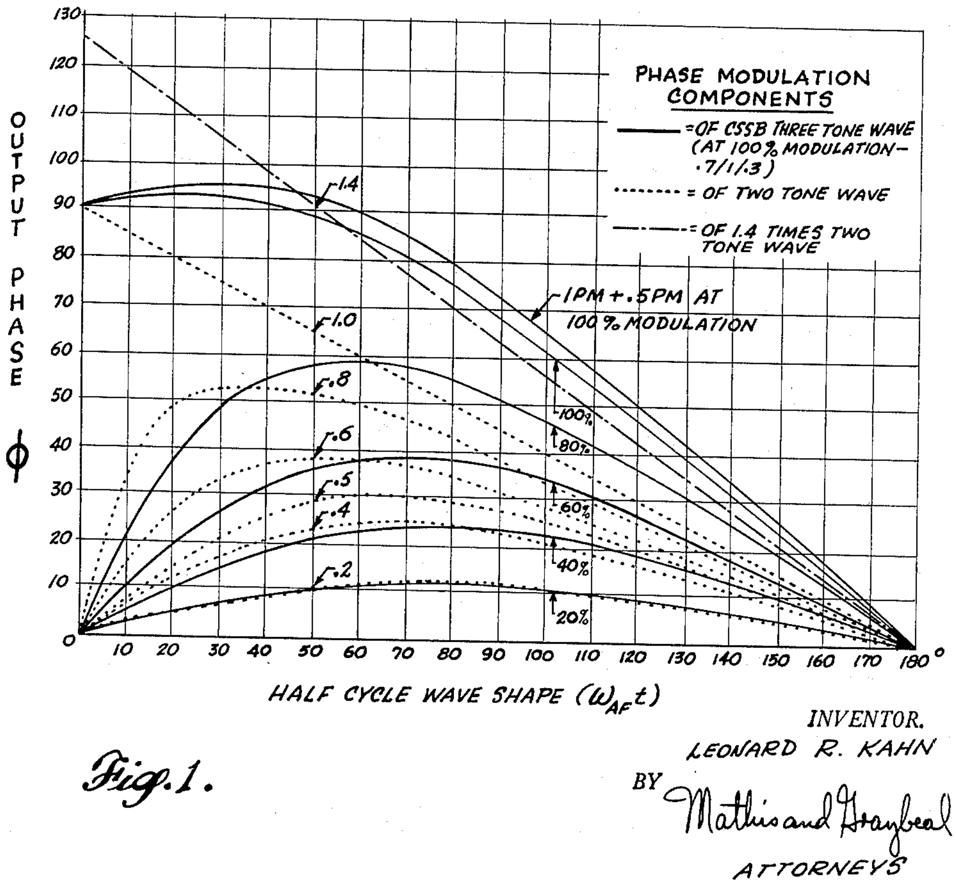

The graphical presentation of FIG. 1 shows, among other things, the output phase characteristics of a three-tone wave having a carrier to first-order-sideband to second-order-sideband ratio of 0.7:1.0:0.3 at 100% modulation. The three-tone wave plots are shown in solid line and labeled 100%, 80%, 60%, 40% and 20% to show the output phase characteristic at these various levels of amplitude modulation.

It is to be noted in FIG. 1, that in each case a half cycle of the phase modulation component is shown. The wave, in each case, is an odd function, about T equals 0; i.e. $f(t)$ equals minus $f(-t)$.

In deriving the curves shown in solid line at FIG. 1, it has been assumed that the first order sideband is linearly proportional to the percentage of modulation and the second order sideband is proportional to the square of the percentage of modulation. In the three-tone wave situation, the carrier amplitude decreases as the modulation increases in accordance with the following relationship:

$$e_{cxr}=E_{cxr}(1-.7_m^2)$$

(where $E_{cxr}$ is the carrier voltage when modulation is absent, and where $m$ is the envelope modulation factor).

The dotted line curves shown in FIG. 1 represent the phase modulation component of a two-tone wave having a carrier-to-sideband ratio as indicated on the curves, that is .2, .4, .5, .6, .8, 1.0 and 1.4. It is seen that, except at very low percentages of modulation, the phase modulation component in the two-tone case is considerably different than that of the ideal compatible single-sideband case.

It is important to note, with respect to FIG. 1, that the desired compatible single-sideband wave at 100% modulation (solid line designated 100%) is very closely approximated by adding together the 1.0 PM wave shape (dotted line designated 1.0) and the .5 PM wave shape (dotted line designated .5). Taken alone, each of these two-tone, PM components waves has too large an amount of phase swing for certain periods of signal angle and too small a phase swing at other signal angle periods. However, when added together, the resultant is very near the optimum phase swing. Such resultant is shown at FIG. 1 by the solid line plot designated "1 PM plus .5 PM." In effect, the essential feature of the present invention with particular regard to the embodiment thereof discussed in detail below, is in its utilization of non-linear circuits and summation mixing so as to produce a summation of the two phase modulation components 1 PM and .5 PM at 100% modulation and achieve the desired phase swing without the inherent complexity of frequency multiplication and frequency division.

Figure 2:
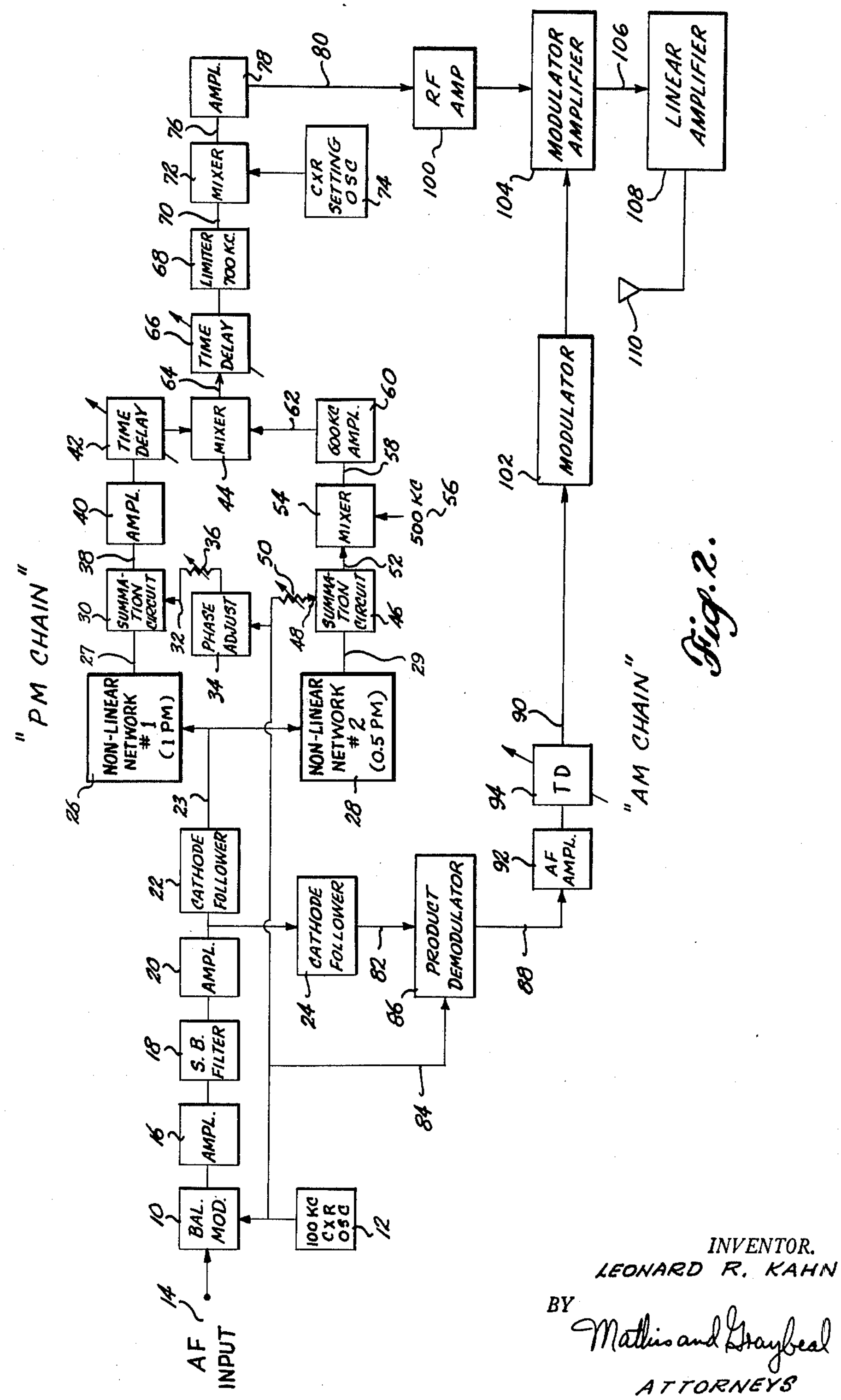
FIG. 2 is a block diagram showing the layout of an improved compatible single-sideband transmitter incorporating the invention.

The block diagram of FIG. 2 serves to show a typical adapter employing the improved 1 PM plus .5 PM procedure of generating the ideal phase modulation component for developing compatible single-sideband radiation. Except for its components pertaining to its phase modulation chain (denoted "PM Chain"), it will be understood that the adapter of FIG. 2 is like the compatible single-sideband adapter systems disclosed in my aforesaid U.S. Patent 2,989,707, and can be used to drive any conventional type of amplitude modulation transmitter, such as a class C high level modulated transmitter, or low level, Doherty, Chereux, or ampliphase type transmitter, for example.

In the adapter shown at FIG. 2, a single-sideband wave is generated in a single-sideband generator, conventional per se, utilizing a balanced modulator 10 receiving a carrier frequency input from carrier oscillator 12 (suitably at 100 kc., for example) and also receiving an audio frequency input 14 from a suitable source. The single-sideband generator further comprises amplifier 16 and sideband filter 18 (such as a high selectivity crystal lattice network), the output from which goes to RF amplifier 20 which in turn feeds the single-sideband-without-carrier wave to cathode follower 22 at the input of the PM Chain and also drives cathode follower 24 at the input of the AM Chain. Cathode follower 22 provides a low output impedance for the single-sideband-without-carrier wave, and its output 23 drives two non-linear circuits 26 and 28, respectively termed "Non-Linear Network No. 1" and "Non-Linear Network No. 2." Each of said non-linear circuits 26 and 28 is adjusted to have different non-linearity characteristics, respectively designated "1 PM" and "0.5 PM," as shown. However, both Non-Linear Networks 1 and 2 provide lower attenuation for high amplitude wave levels than they do for low amplitude wave levels. Recalling the phase swing characteristics of 1 PM and .5 PM two-tone waves, as shown at FIG. 1, it will be observed that said non-linear circuits 26 and 28 are required because the amount of phase modulation boost varies from a maximum (of 1.0 PM plus 0.5 PM) at 100% modulation to unity (1 PM) at very low percentages of modulation.

The output 27 from non-linear circuit 26 feeds a summation circuit 30 which also receives a carrier input 32 obtained from the carrier oscillator 12 and adjusted in phase by phase shift circuit 34 to properly align the relationship between the two paths. This carrier input 32 is adjusted in input level by variable attenuator 36 to make the carrier and sideband levels equal in the output 38 of summation circuit 30. The phase modulation component output of summation circuit 30, passes through RF amplifier 40, time delay 42, and is delivered to mixer 44. It is identifiable as the 1 PM component.

Time delay circuit 42 functions to compensate for small differences in time delay between the 1 PM component path and the .5 PM path next discussed.

Returning to the output 23 from cathode follower 22, such is also fed to non-linear circuit 28, the output 29 from which in turn drives a second summation circuit 46 wherein a carrier input 48 from oscillator 12, adjusted to a level of two times the sideband level at full modulation by attenuator 50, is added to the sideband input from non-linear circuit 28. Thus, the output from 52 from summation circuit 46 at full modulation has a sideband-to-carrier ratio of .5. Said output 52 feeds a mixer 54 wherein the .5 PM component is heterodyned with a 500 kc. input signal 56 (suitably obtained as by a harmonic generator, not shown, driven by carrier oscillator 12). The summation output (e.g., 600 kc.) is selected as the output 58 from mixer 54, then amplified in 600 kc. amplifier 60, then fed as an input 62 to mixer 46 wherein it is heterodyned with the 100 kc. 1 PM wave input from time delay 42 and the summation output (e.g., 700 kc.) is selected as the output 64 from mixer 44. The 700 kc. output 64 from mixer 44 is phase modulated by the sum of the phase modulation of both paths so its phase modulation component equals 1 PM plus .5 PM at 100% modulation. At very low percentages of modulation, the non-linear circuits 26 and 28 function so as to produce a PM component about the same as that of the carrier plus single-sideband wave where the single-sideband to carrier ratio equals the percentage of modulation, or substantially so. This order of phase modulation component is proper for minimizing the undesired sideband and closely approximaing the PM wave shapes of the three-tone wave phase swings (e.g. 20% and 40%) shown in FIG. 1. However, at higher percentages of modulation, said non-linear circuits 26 and 28 function to increase the maximum phase modulation deviation to a degree greater than 1 PM, and substantially progressively so to the point where the phase modulation deviation is 1 PM plus .5 PM at 100% modulation, as indicated. The schematic arrangement of a suitable network for effecting this relation is discussed in more detail below, in connection with FIG. 3.

The output 64 from mixer 44, i.e., the combined phase modulation components, is fed to a variable time delay 66 (to compensate for differences in time delay between the PM chain and the AM chain of the adapter), then fed to a 700 kc. limiter 68 wherein the amplitude modulation component of the wave is removed, producing a pure phase modulated wave. Output 70 from limiter 68 is then converted to the desired carrier frequency in mixer 72, being there heterodyned from an input from the carrier setting oscillator 74. The selected output 76 from mixer 72 is then amplified in RF amplifier 78 and utilized as input 80 to the low level RF stages 100 of the transmitter.

The amplitude modulated component of the system is derived from the single-sideband-without-carrier wave appearing as the output 82 from cathode follower 24 by multiplying same by an input 84 in product demodulator 86 in a manner disclosed per se in the aforesaid U.S.

Patent 2,989,707, the output 88 from said product demodulator 86 being essentially the same as the audio frequency input 14. The reason for deriving the AM component in this manner is to remove from the amplitude modulating audio input 90 fed to the transmitter the envelope distorting harmonics generated in the single-sideband generator, and specifically in sideband filter 18. Unless the amplitude modulating wave is derived in this manner, or unless an elaborate phase shift network is employed in the AM chain, such audio wave does not have the proper phase characteristics for the desired envelope function. The audio fundamental output 88 from product demodulator 86 is suitably amplified, as in AF amplifier 92, and passed through a variable time delay 94 (also available to function in like manner as time delay 66 to compensate for relative difference in time delay between the PM Chain and AM Chain), the output 90 from said time delay 94 being the audio input to modulator 102. In like manner as employed in the transmitter circuit shown in my aforesaid U.S. Patent 2,989,707, modulated amplifier 104 combines the outputs from modulator 102 and RF amplifier stages 100, producing a compatible single-sideband wave at output 106, which is in turn applied to linear amplifier 108 and radiated by antenna 110.

The type of adapter shown in FIG. 2 can be used with any amplitude modulation transmitter in that it produces simply a phase modulated carrier wave and an audio wave for amplitude modulating the carrier wave. While FIG. 2 presents the system as an adapter for conventional amplitude modulation transmitters, it will be of course understood that the characteristic component arrangement and technique involved are readily adaptable to incorporation in new installation design.

FIG. 3 presents a schematic circuit showing the nature of a suitable non-linear network which can be alternately employed either as Non-Linear Network No. 1 (circuit 26) or Non-Linear Network No. 2 (circuit 28) in the adapter illustrated in FIG. 2.

The schematic circuit of FIG. 3 is self-explanatory, with values of circuit components being there given. Essentially, the circuit involves oppositely biased diode gates and a third, fixed attenuation signal path. The lowermost path as shown in FIG. 3, comprises the 10K and 470 ohm resistors and provides a fixed attenuation signal path at about —20 db even though the signal level is not sufficient to render the 1N458 diodes conductive. The signal level at which the diode gates conduct is regulated by a Threshold Bias Control, so designated, and the respective upper and middle signal paths of the circuit provide phase modulation "stretching" by lessening the attenuation of the higher level modulation excursions, i.e. by providing the desired accentuation of the phase modulation component at the higher instantaneous modulation levels. As indicated, the circuit of FIG. 3 can serve either as Non-Linear Network No. 1 or as Non-Linear Network No. 2, and the selection of the threshold level is adjustable in either case simply by variation in setting of the Threshhold Bias Control potentiometer. In a typical installation, the Threshhold Bias Control of Non-Linear Network No. 1 (the 1.0 PM network) in the adapter shown in FIG. 2 is set so that diode conduction begins at maximum envelope excursions corresponding to a modulation level of about 80%, with the diodes becoming fully conductive at maximum envelope excursions corresponding to modulation levels in excess of about 110%. Correspondingly, the Threshold Bias Control of Non-Linear Network No. 2 (the 0.5 PM network) is set so that diode conduction begins at maximum envelope excursions corresponding to a modulation level of about 60%, with the diodes becoming fully conductive at maximum envelope excursions corresponding to modulation levels in excess of about 75%.

To further illustrate the operative nature of the type of non-linear network illustrated at FIG. 3, the attenuation characteristics thereof, applied as a 1 PM network or as a 0.5 PM network, are substantially as follows:

| Input (db) | As a 1 PM Network (db) | As a 0.5 PM Network (db) |
|---|---|---|
| 0 | 0 | 0 |
| −2 | −3 | −6 |
| −4 | −5 | −10.5 |
| −6 | −7.5 | −13 |
| −8 | −9.5 | −15 |
| −10 | −12 | −17.5 |
| −12 | −14 | −19.5 |
| −14 | −16 | −22 |
| −16 | −18 | −24.5 |

As will be noted, with a given Threshhold Bias Control setting, the plate of the upper diode 1N458 is biased slightly negative with respect to its cathode, and the cathode of the lower 1N458 diode is biased slightly positive with respect to its plate so that the upper diode conducts on positive excursions exceeding the desired level of modulation and the lower diode conducts on negative excursions exceeding the desired level of modulation, considering the "desired level of modulation" to be that extent of phase modulation above which the phase modulation should be non-linearly accentuated.

While the adapter shown in FIG. 2 employs two non-linear networks, it will be understood that essentially similar performance can be obtained by use of but a single non-linear network, or simply an over-biased class B amplifier, used in conjunction with a non-attenuated phase modulation signal path. Thus, for example, a single stage multiple level diode gate having 0 db signal drop at 100% modulation, 2.5 db loss at 80% modulation, 4 db loss at 40% modulation, 5.5 db loss at 20% modulation, and 6 db loss at 10% modulation can be used in a 0.5 PM channel in conjunction with a non-attenuated 1 PM channel, by way of example in this regard. Also, it is to be observed that a wave shape approximating the desired phase swing wave shape shown by the plot designated 100% in FIG. 1 can be approximated by synthesis, i.e. by summating the fundamental and certain selected harmonics. Also, it will be understood that in certain variations of the improved phase modulation wave shape provided by the present invention for compatible single-sideband system use, the desired modulation can be realized by a combination of the technique disclosed in my aforesaid U.S. Patent 2,989,707 (i.e. frequency multiplication), coupled with a decreasing phase modulation addition.

From the foregoing considerations, other modifications, adaptations and variations of the basic principles and relationships characteristic of the invention will occur to those skilled in the art, within the scope of the following claims.

What is claimed is:

1. The method of generating a compatible single-sideband wave from a conventional two-tone single sideband wave with the phase modulation of the compatible wave related in a non-linear manner to the phase modulation of the conventional single-sideband wave, comprising increasing the maximum phase modulation deviation of the compatible wave to be progressively but relatively only slightly greater than that of the conventional single-sideband wave for envelope modulation excursions corresponding to modulation levels up to about 60%, and progressively accentuating the maximum phase modulation deviation of the compatible wave at progressively higher modulation excursions corresponding to modulation levels greater than about 60%, until at maximum envelope excursions incident to 100% envelope modulation the maximum phase modulation deviation is greater than the maximum phase modulation deviation of the conventional wave by a relation of about 1.0 PM plus 0.5 PM, the corresponding maximum phase modulation deviation of the conventional wave being 1 PM.

2. The method of generating a compatible single-sideband wave with the phase modulation thereof non-linearly emphasized at higher instantaneous envelope excursions, comprising summating phase modulated component waves, one such component wave being non-linearly derived from a two-tone wave having a sideband-to-carrier ratio of about 1.0:1.0 at 100% modulation, and the other such component wave being non-linearly derived from a two-tone wave having a sideband-to-carrier ratio of about 0.5:1.0 at 100% modulation, the summation of said component waves providing in the compatible wave an extent of maximum phase modulation deviation of about 1.0 PM at instantaneous envelope excursions corresponding to the maximum envelope voltage change at a modulation level of less than about 10%, and providing progressively greater maximum phase modulation deviation in relation to increasing maximum envelope excursions to the extent that the maximum phase modulation deviation is about 1.0 PM plus 0.5 PM at maximum envelope excursions incident to 100% envelope modulation, the maximum phase modulation deviation of a conventional, two-tone single sideband wave being 1.0 PM at relatively the same envelope modulation level.

3. The method of transmitting audio-frequency modulated compatible single-sideband wave for reception by either single-sideband or double-sideband receivers, comprising generating an audio-frequency input signal, generating from the audio frequency input signal a two-tone single-sideband wave, developing from a portion of the two-tone single-sideband wave a phase modulated wave wherein the phase modulation deviations are non-linearly greater at higher modulation levels than at lower modulation levels as compared with the phase modulation deviations of the two-tone single-sideband wave at corresponding modulation levels, limiting the resulting phase modulated wave, deriving a modulating audio-frequency signal containing substantially only components present in the audio-frequency input signal, and amplitude modulating said phase modulated wave with such modulating audio frequency signal.

4. In the method of modulating an audio frequency input signal on a radio frequency carrier wave for reception and detection by either single-sideband or double-sideband receiver means, wherein a conventional single-sideband wave is reconstituted to consist at higher modulation excursions of essentially a somewhat reduced carrier, a first order sideband, and a relatively smaller but substantial second order sideband, the improvement which comprises deriving from said single-sideband wave a phase modulated component wherein the phase modulation deviations are non-linearly related to the level of modulation with comparatively greater phase modulation deviations occurring at higher modulation levels as compared with the phase modulation deviations of the conventional single-sideband wave at corresponding modulation levels, and amplitude modulating such phase modulated radio frequency wave with an audio frequency signal containing substantially only components present in the audio frequency input signal.

5. The method of generating from an input audio wave and radio frequency carrier wave an audio signal modulated single-sideband and carrier wave with amplitude modulated and phase modulated components rendering such compatible for reception by either single-sideband or double-sideband receivers, comprising establishing the amplitude envelope of said single-sideband-and-carrier wave to have substantially the same spectrum components as the input audio wave, while increasing the phase modulation of said single-sideband-and-carrier wave at higher excursions of envelope modulation and in a non-linear manner so that at relatively very low amplitude modulation excursions the maximum phase modulation deviation is substantially 1.0 PM and so that at maximum amplitude modulation excursions incident to 100% envelope modulation the maximum phase modulation deviation is substantially 1 PM plus 0.5 PM, as compared with a maximum phase modulation deviation of 1.0 PM in a conventional two-tone, single-sideband wave.

6. In the method of deriving a compatible single-sideband wave from a single-sideband generator fed by a radio frequency input and an audio frequency input, the improvement comprising reconstituting the envelope of a two-tone single-sideband wave to have essentially the same spectrum components as said audio frequency input without substantial harmonic distortion, and altering the phase modulation component of the single-sideband wave so that the phase modulation deviations appearing in the compatible wave at very low envelope excursions are about 1 PM and the maximum phase modulation deviations of the compatible wave are about 1 PM plus 0.5 PM at envelope excursions corresponding to the maximum envelope excursions occuring at 100% amplitude modulation, as compared with modulation deviations of 1 PM for a conventional single-sideband wave at corresponding envelope excursions.

7. In a radio transmitter wherein a compatible single-sideband-and-carrier wave is generated from a conventional single-sideband-and-carrier wave by means limiting the single-sideband-and-carrier wave, means increasing the extent of phase modulation of the phase modulated wave, and means amplitude modulating the phase modulated wave by an audio signal substantially conforming to the audio input which modulates the carrier wave in the generation of the said conventional single-sideband-and-carrier wave; the improvement comprising means increasing the phase modulation deviation of the phase modulated wave to be progressively but relatively only slightly greater than that of the conventional single-sideband wave for envelope modulation excursions corresponding to modulation levels up to about 60% and progressively accentuating the phase modulation deviation of the compatible wave at progressively higher modulation excursions corresponding to modulation levels greater than about 60% until at maximum envelope excursions incident to 100% envelope modulation the maximum phase modulation deviation is greater than the maximum phase modulation deviation of 1 PM of the conventional wave by a relation of about 1.0 PM plus 0.5 PM, and means limiting the resulting phase modulated wave prior to amplitude modulation thereof by said audio signal.

8. In a radio transmitter for generating a compatible single-sideband wave from a two-tone single-sideband wave in turn derived from an audio input and a radio frequency carrier wave input, the said compatible single-sideband wave being constituted of amplitude modulated and phase modulated components rendering such receivable by either single-sideband or double-sideband receiver means employing envelope detection; the improvement comprising means deriving from said two-tone single-sideband wave phase modulated component waves, means isolating and summating said phase modulated component waves, one such component wave having a sideband-to-carrier ratio of 1.0:1.0 at 100% modulation, and the other such component wave having a sideband-to-carrier ratio of 0.5:1.0 at 100% modulation, the said component waves providing in the compatible wave an extent of maximum phase modulation deviation of about 1.0 PM at instantaneous envelope excursions corresponding to the maximum envelope voltage change at a modulation level of less than about 10%, then progressively accentuating the maximum phase modulation deviation in relation to increasing maximum envelope excursions to the point where the maximum phase modulation deviation is about 1.0 PM plus 0.5 PM at maximum envelope excursions incident to 100% envelope modulation, as compared with a maximum phase modulation deviation of 1.0 PM of said two-tone single-sideband wave at relatively the same envelope modulation levels, said transmitter further comprising means limiting the resulting phase modulated wave, and means amplitude modulating the limited phase modulated wave with an audio signal substantially conforming to said audio input.

9. A radio transmitter for transmitting an audio frequency modulated compatible single-sideband wave for reception by either single-sideband or double-sideband receivers; said transmitter comprising means generating an audio frequency input signal, means generating from the audio frequency input signal a two-tone single-sideband wave, means developing from a portion of the two-tone single-sideband wave a phase modulated wave wherein the phase modulation deviations are accentuated to be non-linearly greater at higher modulation levels than at lower modulation levels as compared with the phase modulation deviations of the two-tone single-sideband wave at corresponding modulation levels, means limiting the resulting phase modulated wave, means deriving a modulating audio frequency signal containing substantially only components present in the audio frequency input signal, and means amplitude modulating the accentuated phase modulated wave with such modulating audio frequency signal.

10. In a radio transmitter for modulating an audio frequency input signal on a radio frequency carrier wave for reception and detection by either single-sideband or double-sideband receiver means, wherein a conventional two-tone single-sideband wave is reconstituted to consist at higher modulation excursions of essentially a somewhat reduced carrier, a first order sideband, and a relatively smaller but substantial second order sideband; the improvement comprising means deriving from said two-tone single-sideband wave a phase modulated wave wherein the maximum phase modulation deviations are non-linearly related to the modulation levels with comparatively greater phase modulation deviations occurring at higher modulation levels as compared with the phase modulation deviations of the two-tone single-sideband wave at corresponding modulation levels, and means amplitude modulating the modified phase modulated wave with an audio frequency signal containing substantially only components present in the audio frequency input signal.

11. In a radio transmitter for generating from an input audio wave and radio frequency carrier wave an audio signal modulated single-sideband-and-carrier wave with amplitude modulated and phase modulated components rendering such compatible for reception by either single-sideband or double-sideband receivers; the improvement comprising means deriving a phase modulated component wave from said single-sideband-and-carrier wave, means accentuating the phase modulation of said phase modulated component wave at higher modulation levels and in a non-linear manner so that at relatively very low modulation levels the maximum phase modulation deviation is substantially 1.0 PM and so that at modulation levels incident to 100% envelope modulation the maximum phase modulation deviation is substantially 1 PM plus 0.5 PM, as compared with a maximum phase modulation deviation of 1.0 PM in the single-sideband-and-carrier wave, said transmitter further comprising means limiting the resulting phase modulated wave, and means amplitude modulating the limited phase modulated wave with an audio signal substantially identical with said input audio wave.

12. In a radio transmitter circuit deriving a compatible single-sideband wave from a two-tone single-sideband wave generated by a single-sideband generator receiving a radio frequency input and an audio frequency input, the improvement comprising means reconstituting the envelope of said two-tone single-sideband wave to have essentially the same spectrum components as said audio frequency input without substantial harmonic distortion, and means altering the phase modulation components of the two-tone single-sideband wave in a manner providing that the phase modulation deviations appearing in the compatible wave at very low envelope excursions are substantially the same as the phase modulation deviations of the two-tone single-sideband wave, i.e. about 1 PM, and providing that the phase modulation deviations of the compatible wave are related to the phase modulation deviations of the two-tone single-sideband wave by an extent of about 1 PM plus 0.5 PM at envelope excursions corresponding to the maximum envelope excursions occurring at 100% amplitude modulation.

13. In a radio transmitter circuit deriving a compatible single-sideband wave from a two-tone single-sideband wave generated by a single-sideband generator receiving a radio frequency input and an audio frequency input, and means transmitting the compatible single-sideband wave produced, the improvement for rendering such two-tone single-sideband wave compatible for reception by either single-sideband or envelope detection receiver means, said improvement comprising means reconstituting the envelope of said two-tone single-sideband wave to have essentially the same spectrum components as said audio frequency input without substantial harmonic distortion, and means altering the phase modulation component of the two-tone single-sideband wave in a manner providing that at very low modulation levels the maximum phase modulation deviation appearing in the transmitted single-sideband wave is about 1.0 PM and substantially the same as the maximum phase modulation deviation of the two-tone single-sideband wave, and providing that at 100% amplitude modulation the maximum phase modulation deviation of the transmitted wave related to the maximum phase modulation deviation of the original single-sideband wave by about 1 PM plus 0.5 PM, as compared with a modulation deviation of 1.0 PM of said two-tone single-sideband wave at the same modulation level.

14. A radio transmitter circuit comprising means generating from an audio frequency input and a radio frequency input a single-sideband-without-carrier wave, two non-linear attenuation networks each fed by a portion of said single-sideband wave, each of said non-linear attenuation networks being summated with a radio frequency input and added together in a mixer stage, then limited in a limiter stage whereby the maximum phase modulation deviation thereof at the maximum envelope excursion is altered to be 1 PM plus 0.5 PM at 100% envelope modulation as compared with a 1 PM phase modulation deviation at maximum envelope excursion of a conventional, two-tone single-sideband wave at a corresponding level of modulation, said transmitter further comprising means amplitude modulating the thus phase modulated radio frequency wave with an audio frequency wave substantially identical to said audio frequency input.

15. A radio transmitter according to claim 14, wherein said non-linear networks have attenuation characteristics substantially according to the following tabulation:

| Input (db) | 1 PM Network (db) | 0.5 PM Network (db) |
|---|---|---|
| 0 | 0 | 0 |
| −2 | −3 | −6 |
| −4 | −5 | −10.5 |
| −6 | −7.5 | −13 |
| −8 | −9.5 | −15 |
| −10 | −12 | −17.5 |
| −12 | −14 | −19.5 |
| −14 | −16 | −22 |
| −16 | −18 | −24.5 |

16. In a radio transmitter comprising a single-sideband-and-carrier generator fed by a radio frequency input and an audio frequency input, and means transmitting the single-sideband wave produced, the improvement rendering such single-sideband-and-carrier wave compatible for reception by either single-sideband or envelope detection receiver means, said improvement comprising means deriving from said radio frequency input and said audio frequency input a single-sideband-without-carrier wave, two non-linear attenuation circuits providing parallel signal paths for said single-sideband-without-carrier wave and respectively altering the signals so that the higher excursions thereof are relativly less attenuated, means summating the outputs of said attenuation circuits with a carrier frequency input to establish such as a single-sideband-and-carrier wave, a first mixing means heterodyning one such altered single-sideband-and-carrier signal with a radio frequency input of a frequency different than said carrier frequency, means selecting the summation output of said first mixing means, a second mixing means receiving as inputs the said summation output and the other attenuation circuit output, and means selecting and limiting the summation output from said second mixing means to provide a phase modulated carrier wave with the maximum phase modulation deviations thereof accentuated at maximum envelope excursions corresponding to high modulation levels, the said transmitter further comprising means amplitude modulating the resulting phase modulated carrier wave with an audio frequency wave corresponding to said audio frequency input.

17. The radio transmitter of claim 16, wherein each of said non-linear attenuation circuits comprises a fixed attenuation signal path and oppositely biased diode gates in parallel therewith, the bias levels of said diode gates being established to become conductive only at envelope excursions corresponding to envelope excursions at modulation levels exceeding at least about 60% amplitude modulation.

18. The radio transmitter of claim 17, wherein one such non-linear attenuation network is biased to have the diode gates thereof begin to conduct at the maximum envelope excursion incident to a modulation level of about 80% and the other such non-linear attenuation network is biased to have the diode gates thereof begin to conduct at the maximum envelope excursion incident to a modulation level of about 60%.

19. A radio transmitter according to claim 18, wherein said non-linear networks have attenuation characteristics substantially according to the following tabulation:

| Input (db) | First Network (db) | Second Network (db) |
|---|---|---|
| 0 | 0 | 0 |
| −2 | −3 | −6 |
| −4 | −5 | −10.5 |
| −6 | −7.5 | −13 |
| −8 | −9.5 | −15 |
| −10 | −12 | −17.5 |
| −12 | −14 | −19.5 |
| −14 | −16 | −22 |
| −16 | −18 | −24.5 |

References Cited by the Examiner

UNITED STATES PATENTS 2,944,228 7/60 Olive ---------------- 332—45
2,761,105 8/56 Crosby -------------- 179—15.5
2,774,041 12/56 Finch et al. ----------- 332—45
2,944,228 7/60 Olive ---------------- 332—45

DAVID G. REDINBAUGH, *Primary Examiner.*

ROBERT H. ROSE, *Examiner.*